(12) United States Patent
Guerra

(10) Patent No.: US 7,173,067 B2
(45) Date of Patent: Feb. 6, 2007

(54) POLYMER ELECTROLYTE MEMBRANES CROSSLINKED BY DIRECT FLUORINATION

(75) Inventor: Miguel A. Guerra, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 203 days.

(21) Appl. No.: 10/738,083

(22) Filed: Dec. 17, 2003

(65) Prior Publication Data

US 2005/0137351 A1 Jun. 23, 2005

(51) Int. Cl.
C08F 8/22 (2006.01)

(52) U.S. Cl. ........................ 521/31; 525/326.4; 525/356

(58) Field of Classification Search .................. 521/31; 525/356, 326.4
See application file for complete search history.

(56) References Cited

U.S. PATENT DOCUMENTS

| | | | |
|---|---|---|---|
| 3,282,875 A | 11/1966 | Connolly et al. |
| 3,635,926 A | 1/1972 | Gresham et al. |
| 3,784,399 A | 1/1974 | Grot |
| 3,853,828 A | 12/1974 | Wall et al. |
| 4,000,356 A | 12/1976 | Weisgerber et al. |
| 4,073,752 A | 2/1978 | Ramp |
| 4,169,023 A | 9/1979 | Sata et al. |
| 4,214,060 A | 7/1980 | Apotheker et al. |
| 4,218,542 A | 8/1980 | Ukihashi et al. |
| 4,230,549 A | 10/1980 | D'Agostino et al. |
| 4,242,498 A | 12/1980 | Rosser et al. |
| 4,268,650 A | 5/1981 | Rose |
| 4,281,092 A | 7/1981 | Breazeale |
| 4,330,654 A | 5/1982 | Ezzell et al. |
| 4,334,082 A | 6/1982 | Resnick |
| 4,391,844 A | 7/1983 | Baczek et al. |
| 4,414,159 A | 11/1983 | Resnick |
| 4,440,917 A | 4/1984 | Resnick |
| 4,454,247 A | 6/1984 | Resnick |
| 4,470,889 A | 9/1984 | Ezzell et al. |
| 4,508,603 A | 4/1985 | Ukihashi et al. |
| 4,522,952 A * | 6/1985 | Klein et al. ................ 521/31 |
| 4,602,045 A | 7/1986 | Markus et al. |
| 4,686,024 A | 8/1987 | Scherer, Jr. et al. |
| 4,734,474 A | 3/1988 | Hamada et al. |
| 4,743,419 A | 5/1988 | Bierschenk |
| 4,755,567 A | 7/1988 | Bierschenk et al. |
| 4,981,932 A | 1/1991 | Blaise et al. |
| 5,260,351 A | 11/1993 | Logothetis |
| 5,264,508 A | 11/1993 | Ishibe et al. |
| 5,330,626 A | 7/1994 | Banerjee |
| 5,466,930 A | 11/1995 | Schlenoff |
| 5,527,861 A | 6/1996 | Logothetis |
| 5,608,022 A | 3/1997 | Nakayama et al. |
| 5,693,748 A | 12/1997 | Ikeda et al. |
| 5,795,496 A | 8/1998 | Yen et al. |
| 5,798,417 A | 8/1998 | Howard, Jr. |
| 5,804,650 A | 9/1998 | Tsuda et al. |
| 5,852,148 A | 12/1998 | Behr et al. |
| 5,986,012 A | 11/1999 | Legare et al. |
| 6,011,074 A | 1/2000 | Sorenson et al. |
| 6,090,895 A | 7/2000 | Mao et al. |
| 6,224,994 B1 | 5/2001 | Asukabe et al. |
| 6,225,368 B1 | 5/2001 | D'Agostino et al. |
| 6,242,123 B1 | 6/2001 | Nezu et al. |
| 6,248,469 B1 | 6/2001 | Formato et al. |
| 6,254,978 B1 | 7/2001 | Bahar et al. |
| 6,255,370 B1 | 7/2001 | Vizcaino et al. |
| RE37,307 E | 8/2001 | Bahar et al. |
| 6,274,677 B1 | 8/2001 | Tatemoto |
| 6,277,512 B1 | 8/2001 | Hamrock et al. |
| 6,355,370 B2 | 3/2002 | Katoh et al. |
| RE37,656 E | 4/2002 | Bahar et al. |
| 6,365,769 B1 | 4/2002 | Behr et al. |
| 6,380,337 B2 | 4/2002 | Abe et al. |
| RE37,701 E | 5/2002 | Bahar et al. |
| 6,387,964 B1 | 5/2002 | D'Agostino et al. |
| 6,423,784 B1 | 7/2002 | Hamrock et al. |
| 6,426,397 B1 | 7/2002 | Armand et al. |
| 6,462,228 B1 | 10/2002 | Dams |
| 6,498,216 B1 | 12/2002 | Cheng |

(Continued)

FOREIGN PATENT DOCUMENTS

DE 26 24 203 12/1976

(Continued)

OTHER PUBLICATIONS

U.S. Appl. No. 10/325,278, filed Dec. 19, 2002; Polymer Electrolyte Membrane; (57929US002).

(Continued)

*Primary Examiner*—Bernard Lipman
(74) *Attorney, Agent, or Firm*—Philip Y. Dahl

(57) ABSTRACT

A method is provided for making a crosslinked polymer by direct fluorination of a non-perfluorinated polymer comprising first pendent groups which comprise sulfonyl halide groups or by direct fluorination of a polymer mixture of a first polymer which is a non-perfluorinated polymer and a second polymer which comprises first pendent groups which comprise sulfonyl halide groups. Such crosslinked polymers or polymer mixtures may be used to make polymer electrolyte membranes (PEM's) that may be used in electrolytic cells such as fuel cells and which should demonstrate increased durability in fuel cell use.

13 Claims, No Drawings

U.S. PATENT DOCUMENTS

| | | |
|---|---|---|
| 6,503,378 B1 | 1/2003 | Fisher |
| 6,552,135 B2 | 4/2003 | Schnurnberger et al. |
| 6,624,328 B1 | 9/2003 | Guerra |
| 6,649,703 B2 | 11/2003 | Michot et al. |
| 6,667,377 B2 | 12/2003 | Feiring et al. |
| 6,670,424 B1 | 12/2003 | Michot et al. |
| 6,872,781 B2 | 3/2005 | Hedhli et al. |
| 2002/0014405 A1 | 2/2002 | Arcella et al. |
| 2002/0040106 A1 | 4/2002 | Wlassics et al. |
| 2003/0032739 A1 | 2/2003 | Kerres et al. |
| 2003/0092940 A1 | 5/2003 | Hamrock |
| 2003/0181572 A1 | 9/2003 | Tan et al. |
| 2003/0181615 A1 | 9/2003 | Ameduri et al. |
| 2003/0208014 A1 | 11/2003 | Kerres et al. |
| 2004/0241518 A1 | 12/2004 | Yang |
| 2005/0096442 A1 | 5/2005 | Thaler et al. |
| 2005/0107488 A1 | 5/2005 | Yandrasits et al. |
| 2005/0107489 A1 | 5/2005 | Yandrasits et al. |
| 2005/0107490 A1 | 5/2005 | Yandrasits et al. |
| 2005/0107532 A1 | 5/2005 | Guerra et al. |
| 2005/0113528 A1 | 5/2005 | Jing et al. |
| 2005/0131096 A1 | 6/2005 | Jing et al. |
| 2005/0131097 A1 | 6/2005 | Jing et al. |

FOREIGN PATENT DOCUMENTS

| | | |
|---|---|---|
| DE | 26 38 791 | 3/1977 |
| DE | 100 21 104 A1 | 11/2001 |
| EP | 0 048 964 A2 | 4/1982 |
| EP | 0 407 937 | 1/1991 |
| EP | 0 422 231 B1 | 12/1995 |
| EP | 1 085 038 A1 | 3/2001 |
| EP | 1 091 435 A1 | 4/2001 |
| EP | 1 179 548 A1 | 2/2002 |
| EP | 1 238 999 A1 | 9/2002 |
| EP | 1 359 142 A1 | 11/2003 |
| FR | 2 387 260 | 12/1976 |
| GB | 1184321 | 3/1970 |
| JP | 53-29291 | 3/1978 |
| JP | 53-97988 | 8/1978 |
| JP | 53-134088 | 11/1978 |
| JP | 54-52690 | 4/1979 |
| JP | 56-72002 | 6/1981 |
| JP | SHO 60-250009 | 12/1985 |
| JP | SHO 62-288617 | 12/1987 |
| JP | 64-3140 | 1/1989 |
| JP | 5-314960 | 11/1993 |
| JP | 8-239494 | 9/1996 |
| JP | 2000-119420 | 4/2000 |
| JP | 2000-268834 | 9/2000 |
| JP | 2001-29800 | 2/2001 |
| JP | 2001-176524 | 6/2001 |
| JP | 2001-354641 | 12/2001 |
| JP | 2002-003466 | 1/2002 |
| JP | 2002-313364 | 10/2002 |
| WO | WO 94/03503 | 2/1994 |
| WO | WO 97/17381 | 5/1997 |
| WO | WO 99/38897 | 8/1999 |
| WO | WO 00/52060 | 9/2000 |
| WO | WO 01/27167 A1 | 4/2001 |
| WO | WO 01/87992 A2 | 11/2001 |
| WO | WO 01/96268 A2 | 12/2001 |
| WO | WO 02/50142 A1 | 6/2002 |
| WO | WO 02/062749 A1 | 8/2002 |
| WO | WO 02/087001 A2 | 10/2002 |
| WO | WO 02/103834 A1 | 12/2002 |
| WO | WO 03/004463 A1 | 1/2003 |
| WO | WO 03/022892 A2 | 3/2003 |

OTHER PUBLICATIONS

Kirk-Othmer, *Encyclopedia of Chemical Technology*, 3d ed., vol. 10, (1980), pp. 840-855.

Gab-Jin Hwang et al.; "Preparation Of Cation Exchange Membrane As A Separator For The All-Vanadium Redox Flow Battery", Journal of Membrane Science, Elsevier Scientific Publ. Company, Amsterdam, NL, vol. 120, No. 1, Oct. 30, 1996, pp. 55-67.

\* cited by examiner

POLYMER ELECTROLYTE MEMBRANES CROSSLINKED BY DIRECT FLUORINATION

FIELD OF THE INVENTION

The invention relates to a crosslinked polymer electrolyte membrane made by a method that comprises the step of direct fluorination of a non-perfluorinated polymer, typically highly fluorinated polymer, comprising first pendent groups which comprise sulfonyl halide groups, or direct fluorination of a polymer mixture of a first polymer which is a non-perfluorinated polymer and a second polymer which comprises first pendent groups which comprise sulfonyl halide groups. The process may be used to make crosslinked polymer electrolyte membranes (PEM's) which may be used in electrolytic cells such as fuel cells.

BACKGROUND OF THE INVENTION

Copolymers of tetrafluoroethylene (TFE) and a co-monomer according to the formula: $FSO_2$—$CF_2$—$CF_2$—O—CF($CF_3$)—$CF_2$—O—CF=$CF_2$ are known and sold in sulfonic acid form, i.e., with the $FSO_2$— end group hydrolyzed to $HSO_3$—, under the trade name Nafion® by DuPont Chemical Company, Wilmington, Del. Nafion® is commonly used in making polymer electrolyte membranes for use in fuel cells.

Copolymers of tetrafluoroethylene (TFE) and a co-monomer according to the formula: $FSO_2$—$CF_2$—$CF_2$—O—CF=$CF_2$ are known and used in sulfonic acid form, i.e., with the $FSO_2$— end group hydrolyzed to $HSO_3$—, in making polymer electrolyte membranes for use in fuel cells.

U.S. patent application Ser. No. 10/325,278, filed Dec. 19, 2002, the disclosure of which is incorporated herein by reference, discloses a polymer electrolyte membrane having a thickness of 90 microns or less and comprising a polymer, said polymer comprising a highly fluorinated backbone and recurring pendent groups according to the formula:

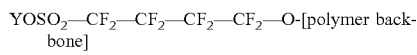
YOSO₂—CF₂—CF₂—CF₂—CF₂—O-[polymer backbone]

where Y is $H^+$ or a monovalent cation such as an alkali metal cation. Typically, the membrane is a cast membrane. Typically, the polymer has a hydration product of greater than 22,000. Typically, the polymer has an equivalent weight of 800–1200.

U.S. Pat. No. 6,277,512 discloses a polymer electrolyte membrane comprising an intimate mixture of an ionomeric polymer and a structural film-forming polymer. Optionally, one or both are crosslinked.

U.S. Pat. No. 5,986,012 purportedly discloses a process for fluorinating a perfluoroelastomer which has previously been crosslinked by exposure to ionizing radiation, which purportedly results in a product with reduced outgassing.

U.S. Pat. No. 4,755,567 purportedly discloses a process for direct fluorination of ethers in the presence of hydrogen fluoride scavengers such as sodium fluoride and potassium fluoride.

U.S. Pat. No. 4,743,419 purportedly discloses a process for on-line film fluorination of a continuous polymer film.

U.S. Pat. No. 4,686,024 purportedly discloses novel perfluoro chemicals and a method for the preparation thereof which may include fluorination with an excess of fluorine gas such that intermediate carbon radicals react with fluorine rather than each other.

Kirk-Othmer, *Encyclopedia of Chemical Technology*, 3d ed., vol. 10, (1980) addresses direct fluorination at pages 840–855. At page 851, that reference states, "[F]luorocarbon polymers can be produced with chemical compositions very similar to polytetrafluoroethylene by the direct reaction of fluorine with polyethylene and the perfluoroanalogues of polypropylene and polystyrene can be prepared. These fluorocarbon polymers differ from the more familiar linear structures because carbon-carbon cross-linking occurs to a significant extent during fluorination."

SUMMARY OF THE INVENTION

The present invention provides a method of making a crosslinked polymer comprising the steps of: a) providing a non-perfluorinated polymer comprising first pendent groups which comprise sulfonyl halide groups; and b) direct fluorinating the polymer. The method may additionally comprise, prior to step b) of direct fluorinating the polymer, the step of: c) forming said polymer into a membrane, typically having a thickness of 90 microns or less, more typically 60 microns or less, and most typically 30 microns or less. The method may additionally comprise, after step b) of direct fluorinating the polymer, the step of: d) converting the sulfonyl halide groups to sulfonic acid groups. The non-perfluorinated polymer may be highly fluorinated. The non-perfluorinated polymer may be a polymer of monomers which include tetrafluoroethylene (TFE) and vinylidene fluoride (VDF). The first pendent groups may be according to the formula: —$R^1$—$SO_2X$, where X is a halogen and where $R^1$ is a branched or unbranched perfluoroalkyl or perfluoroether group comprising 1–15 carbon atoms and 0–4 oxygen atoms, such as —O—$CF_2$—$CF_2$—$CF_2$—$CF_2$—$SO_2X$ or —O—$CF_2$—CF($CF_3$)—O—$CF_2$—$CF_2$—$SO_2X$. Optionally, step c) may comprise imbibing the polymer into a porous supporting matrix, such as a porous polytetrafluoroethylene web or a porous web of a highly fluorinated, non-perfluorinated polymer.

In another aspect, the present invention provides a method of making a crosslinked polymer comprising the steps of: a) providing a polymer mixture of a first polymer which is a non-perfluorinated polymer and a second polymer which comprises first pendent groups which comprise sulfonyl halide groups; and b) direct fluorinating the polymer mixture. The method may additionally comprise, prior to step b) of direct fluorinating the polymer mixture, the step of: c) forming said polymer into a membrane, typically having a thickness of 90 microns or less, more typically 60 microns or less, and most typically 30 microns or less. The method may additionally comprise, after step b) of direct fluorinating the polymer mixture, the step of: d) converting the sulfonyl halide groups to sulfonic acid groups. The first polymer may be a copolymer of tetrafluoroethylene (TFE) and vinylidene fluoride (VDF). The first polymer may be a terpolymer of tetrafluoroethylene (TFE), hexafluoropropylene (HFP) and vinylidene fluoride (VDF). The second polymer may be perfluorinated or non-perfluorinated. The first pendent groups may be according to the formula: —$R^1$—$SO_2X$, where X is a halogen and where $R^1$ is a branched or unbranched perfluoroalkyl or perfluoroether group comprising 1–15 carbon atoms and 0–4 oxygen atoms, such as —O—$CF_2$—$CF_2$—$CF_2$—$CF_2$—$SO_2X$ or —O—$CF_2$—CF($CF_3$)—O—$CF_2$—$CF_2$—$SO_2X$. Optionally, step c) may comprise imbibing the polymer mixture into a porous supporting matrix, such as a porous polytetrafluoroethylene web or a porous web of a highly fluorinated, non-perfluorinated polymer.

In another aspect, the present invention provides polymer electrolyte membranes comprising the crosslinked polymers made according to any of the methods of the present invention.

In another aspect, the present invention provides polymer electrolyte membranes made according to any of the methods of the present invention.

In this application:

"equivalent weight" (EW) of a polymer means the weight of polymer which will neutralize one equivalent of base;

"hydration product" (HP) of a polymer means the number of equivalents (moles) of water absorbed by a membrane per equivalent of sulfonic acid groups present in the membrane multiplied by the equivalent weight of the polymer; and "highly fluorinated" means containing fluorine in an amount of 40 wt % or more, typically 50 wt % or more and more typically 60 wt % or more.

DETAILED DESCRIPTION

The present invention provides a crosslinked polymer, typically a polymer electrolyte membrane, made by direct fluorination of a non-perfluorinated polymer comprising first pendent groups which comprise sulfonyl halide groups or by direct fluorination of a polymer mixture of a first polymer which is a non-perfluorinated polymer and a second polymer which comprises first pendent groups which comprise sulfonyl halide groups. Such crosslinked polymers or polymer mixtures may be used to make polymer electrolyte membranes (PEM's) that may be used in electrolytic cells such as fuel cells. Use of the crosslinked polymers or polymer mixtures according to the present invention should result in increased PEM durability and increased PEM lifetime in fuel cell use.

PEM's manufactured from the crosslinked polymer according to the present invention may be used in the fabrication of membrane electrode assemblies (MEA's) for use in fuel cells. An MEA is the central element of a proton exchange membrane fuel cell, such as a hydrogen fuel cell. Fuel cells are electrochemical cells which produce usable electricity by the catalyzed combination of a fuel such as hydrogen and an oxidant such as oxygen. Typical MEA's comprise a polymer electrolyte membrane (PEM) (also known as an ion conductive membrane (ICM)), which functions as a solid electrolyte. One face of the PEM is in contact with an anode electrode layer and the opposite face is in contact with a cathode electrode layer. Each electrode layer includes electrochemical catalysts, typically including platinum metal. Gas diffusion layer layers (GDL's) facilitate gas transport to and from the anode and cathode electrode materials and conduct electrical current. The GDL may also be called a fluid transport layer (FTL) or a diffuser/current collector (DCC). The anode and cathode electrode layers may be applied to GDL's in the form of a catalyst ink, and the resulting coated GDL's sandwiched with a PEM to form a five-layer MEA. Alternately, the anode and cathode electrode layers may be applied to opposite sides of the PEM in the form of a catalyst ink, and the resulting catalyst-coated membrane (CCM) sandwiched with two GDL's to form a five-layer MEA. The five layers of a five-layer MEA are, in order: anode GDL, anode electrode layer, PEM, cathode electrode layer, and cathode GDL. In a typical PEM fuel cell, protons are formed at the anode via hydrogen oxidation and transported across the PEM to the cathode to react with oxygen, causing electrical current to flow in an external circuit connecting the electrodes. The PEM forms a durable, non-porous, electrically non-conductive mechanical barrier between the reactant gases, yet it also passes $H^+$ ions readily.

In one embodiment of the present invention, a non-perfluorinated polymer comprising first pendent groups which comprise sulfonyl halide groups is direct fluorinated. The polymer having first pendent groups must be non-perfluorinated in this first embodiment. In a second embodiment of the present invention, a polymer mixture of a first polymer which is a non-perfluorinated polymer and a second polymer which comprises first pendent groups which comprise sulfonyl halide groups is direct fluorinated. The polymer having first pendent groups may be perfluorinated or non-perfluorinated in this second embodiment. The first polymer must be non-perfluorinated in this second embodiment.

The polymer having first pendent groups used in the method according to the present invention comprises a backbone, which may be branched or unbranched but is typically unbranched, and first pendent groups. Where this polymer is non-perfluorinated, hydrogens may appear in the backbone or in the side groups, but more typically appear in the backbone. The backbone may comprise units derived from any suitable monomers, including units derived from tetrafluoroethylene (TFE), typically $—CF_2—CF_2—$ units, units derived from vinylidene fluoride (VDF), typically $—CF_2—CH_2—$ units, and units derived from other co-monomers, typically including at least one according to the formula $CF_2=CY—R$ where Y is typically F but may also be $CF_3$, and where R is a first pendent group which includes a group according to the formula $—SO_2X$, where X is a halogen. X is most typically F. Typically, the moiety immediately attached to the $—SO_2X$ group is a $—CF_2—$ group, since this may result in greater stability of the $—SO_2X$ group during fluorination. In an alternative embodiment, first side groups R may be added to the backbone by grafting. Typically, first side groups R are highly fluorinated, having between 50% and 100% of hydrogens substituted with fluorine. Typically, R is $—R^1—SO_2X$, where $R^1$ is a branched or unbranched perfluoroalkyl or perfluoroether group comprising 1–15 carbon atoms and 0–4 oxygen atoms. $R^1$ is typically $—O—R^2—$ wherein $R^2$ is a branched or unbranched perfluoroalkyl or perfluoroether group comprising 1–15 carbon atoms and 0–4 oxygen atoms. $R^1$ is more typically $—O—R^3—$ wherein $R^3$ is a perfluoroalkyl group comprising 1–15 carbon atoms. Examples of $R^1$ include:

$—(CF_2)_n—$ where n is 1, 2, 3, 4, 5, 6, 7, 8, 9, 10, 11, 12, 13, 14 or 15

$(—CF_2CF(CF_3)—)_n$ where n is 1, 2, 3, 4, or 5

$(—CF(CF_3)CF_2—)_n$ where n is 1, 2, 3, 4, or 5 $(—CF_2CF(CF_3)—)_n—CF_2—$ where n is 1, 2, 3 or 4

$(—O—CF_2CF_2—)_n$ where n is 1, 2, 3, 4, 5, 6 or 7

$(—O—CF_2CF_2CF_2—)_n$ where n is 1, 2, 3, 4, or 5

$(—O—CF_2CF_2CF_2CF_2—)_n$ where n is 1, 2 or 3

$(—O—CF_2CF(CF_3)—)_n$ where n is 1, 2, 3, 4, or 5

$(—O—CF_2CF(CF_2CF_3)—)_n$ where n is 1, 2 or 3

$(—O—CF(CF_3)CF_2—)_n$ where n is 1, 2, 3, 4 or 5

$(—O—CF(CF_2CF_3)CF_2—)_n$ where n is 1, 2 or 3

$(—O—CF_2CF(CF_3)—)_n—O—CF_2CF_2—$ where n is 1, 2, 3 or 4

$(—O—CF_2CF(CF_2CF_3)—)_n—O—CF_2CF_2—$ where n is 1, 2 or 3

$(—O—CF(CF_3)CF_2—)_n—O—CF_2CF_2—$ where n is 1, 2, 3 or 4

$(—O—CF(CF_2CF_3)CF_2—)_n—O—CF_2CF_2—$ where n is 1, 2 or 3

—O—(CF$_2$)$_n$— where n is 1, 2, 3, 4, 5, 6, 7, 8, 9, 10, 11, 12, 13 or 14

R is typically —O—CF$_2$CF$_2$CF$_2$CF$_2$—SO$_2$X or —O—CF$_2$—CF(CF$_3$)—O—CF$_2$—CF$_2$—SO$_2$X and most typically —O—CF$_2$CF$_2$CF$_2$CF$_2$—SO$_2$X, where X is a halogen. The —SO$_2$X group is most typically —SO$_2$F during polymerization, i.e., X is F, and the sulfonyl fluoride group is typically hydrolyzed to —SO$_3$H prior to use of the fluoropolymer as an ionomer.

Fluoromonomers providing first side group R may be synthesized by any suitable means, including methods disclosed in U.S. Pat. No. 6,624,328.

Where a polymer mixture of first and second polymers is used, the first polymer may be any suitable non-perfluorinated polymer, including copolymers of tetrafluoroethylene (TFE) and vinylidene fluoride (VDF) and terpolymers of tetrafluoroethylene (TFE), hexafluoropropylene (HFP) and vinylidene fluoride (VDF), which may be known as THV polymers. In some embodiments, a non-fluorinated polymer may be used, such as polyethylene, polypropylene, and the like. Fluorine and hydrogen content of the first polymer are typically determined so as to provide adequate crosslinking and adequate miscibility with the second polymer.

The polymers may be made by any suitable method, including emulsion polymerization, extrusion polymerization, polymerization in supercritical carbon dioxide, solution or suspension polymerization, and the like, which may be batchwise or continuous.

First and second polymers may be mixed by any suitable method, including mixing in solution or suspension, kneading, milling, or the like. The ratio of first and second polymers is typically determined so as to provide adequate crosslinking and satisfy the hydration product and equivalent weight terms described below. Typically, the mixture contains 1–50%, more typically 1–25%, and more typically 1–10% of the first polymer. Where less fluorinated or unfluorinated first polymers are used, it may be possible to use smaller amounts of the first polymer and achieve the desired degree of crosslinking.

In one embodiment of the present invention, the polymer or polymer mixture is formed into a membrane prior to crosslinking. Any suitable method of forming the membrane may be used. The polymer or polymer mixture is typically cast from a suspension or solution. Any suitable casting method may be used, including bar coating, spray coating, slit coating, brush coating, and the like. Alternately, the membrane may be formed from neat polymer or polymer mixture in a melt process such as extrusion. After forming, the membrane may be annealed. Typically the membrane has a thickness of 90 microns or less, more typically 60 microns or less, and most typically 30 microns or less. A thinner membrane may provide less resistance to the passage of ions. In fuel cell use, this results in cooler operation and greater output of usable energy. Thinner membranes must be made of materials that maintain their structural integrity in use.

In a further embodiment, the polymer or polymer mixture may be imbibed into a porous supporting matrix prior to crosslinking, typically in the form of a thin membrane having a thickness of 90 microns or less, more typically 60 microns or less, and most typically 30 microns or less. Any suitable method of imbibing the polymer or polymer mixture into the pores of the supporting matrix may be used, including overpressure, vacuum, wicking, immersion, and the like. The polymer or polymer mixture becomes embedded in the matrix upon crosslinking. Any suitable supporting matrix may be used. Typically the supporting matrix is electrically non-conductive. Typically, the supporting matrix is composed of a fluoropolymer, which may be perfluorinated or more typically non-perfluorinated. In the case where a non-perfluorinated matrix is used, the process of direct fluorination may covalently bind the matrix to the polymer or polymer mixture imbibed therein. Typical perfluorinated matrices include porous polytetrafluoroethylene (PTFE), such as biaxially stretched PTFE webs. Typical non-perfluorinated matrices include webs of TFE/VDF copolymers. Additional embodiments may be found in U.S. Pats. Nos. RE37,307, RE37,656, RE37,701, and 6,254,978, the disclosures of which are incorporated herein by reference.

The step of crosslinking is accomplished by direct fluorination, i.e., by application of fluorine gas to the polymer. Any suitable process may be used, including the LaMar process or other processes described or cited in the references listed in the Background of the present application. Typically the fluorine gas is diluted with nitrogen gas, the mixture typically containing 5–40% fluorine by volume. Typical reaction temperatures are between −20° C. and 150° C. Lower temperatures may prevent removal of sulfonyl halide groups from the polymer. Without wishing to be bound by theory, it is believed that backbone and side-chain hydrogens may be abstracted in the fluorination process, leaving reactive radicals which form crosslinks. Crosslinking may occur before or after annealing. The resulting crosslinked polymer is typically perfluorinated or nearly perfluorinated.

After crosslinking, the sulfur-containing functions of the first pendant groups may be converted to sulfonic acid form by any suitable process, such as hydrolysis. In one typical process, the polymer is immersed in an aqueous solution of LiOH, NaOH or KOH, washed in water, and subsequently acidified by immersion in nitric acid followed by further washing in water.

The acid-functional pendent groups typically are present in the polymer or polymer mixture in an amount sufficient to result in an hydration product (HP) of greater than 22,000, more typically greater than 23,000, more typically greater than 24,000, and most typically greater than 25,000. In general, higher HP correlates with higher ionic conductance.

The acid-functional pendent groups typically are present in the polymer or polymer mixture in an amount sufficient to result in an equivalent weight (EW) of less than 1200, more typically less than 1100, and more typically less than 1000, and more typically less than 900.

It will be understood that membranes made according to the method of the present invention may differ in chemical structure from those made by other methods, in the structure of crosslinks, the placement of crosslinks, the placement of acid-functional groups, the presence or absence of crosslinks on pendent groups or of acid-functional groups on crosslinks, and the like.

This invention is useful in the manufacture of strengthened polymer electrolyte membranes for use in electrolytic cells such as fuel cells.

Various modifications and alterations of this invention will become apparent to those skilled in the art without departing from the scope and principles of this invention, and it should be understood that this invention is not to be unduly limited to the illustrative embodiments set forth hereinabove.

I claim:

1. A method of making a crosslinked polymer comprising the steps of:

a) providing a non-perfluorinated polymer comprising first pendent groups which comprise sulfonyl halide groups; and
b) direct fluorinating said polymer.

2. The method according to claim 1 additionally comprising, prior to step b) of direct fluorinating said polymer, the step of:
c) forming said polymer into a membrane.

3. The method according to claim 2 wherein said membrane has a thickness of 90 microns or less.

4. The method according to claim 2 wherein said membrane has a thickness of 60 microns or less.

5. The method according to claim 1 additionally comprising, after step b) of direct fluorinating said polymer, the step of:
d) converting said sulfonyl halide groups to sulfonic acid groups.

6. The method according to claim 1 wherein said non-perfluorinated polymer is highly fluorinated.

7. The method according to claim 6 wherein said highly fluorinated, non-perfluorinated polymer comprises units derived from tetrafluoroethylene (TFE) monomers and vinylidene fluoride (VDF) monomers.

8. The method according to claim 1 wherein said first pendent groups are according to the formula: $-R^1-SO_2X$, where X is a halogen and where $R^1$ is a branched or unbranched perfluoroalkyl or perfluoroether group comprising 1–15 carbon atoms and 0–4 oxygen atoms.

9. The method according to claim 1 wherein said first pendent groups are according to the formula: $-O-CF_2-CF_2-CF_2-CF_2-SO_2X$, where X is a halogen.

10. The method according to claim 1 wherein said first pendent groups are according to the formula: $-O-CF_2-CF(CF_3)-O-CF_2-CF_2-SO_2X$, where X is a halogen.

11. The method according to claim 2 wherein step c) comprises imbibing said polymer into a porous supporting matrix.

12. The method according to claim 11 wherein said porous supporting matrix is a porous polytetrafluoroethylene web.

13. The method according to claim 11 wherein said porous supporting matrix is a porous web of a non-perfluorinated polymer.

* * * * *